United States Patent [19]

Chen et al.

[11] 4,006,122

[45] Feb. 1, 1977

[54] POLYESTER-AMIDES PREPARED FROM POLYMALONATES AND ISOCYANATES

[75] Inventors: Augustin T. Chen, Hamden; William J. Farrissey, Jr., Northford, both of Conn.

[73] Assignee: The Upjohn Company, Kalamazoo, Mich.

[22] Filed: Mar. 11, 1974

[21] Appl. No.: 449,938

[52] U.S. Cl. .................. 260/75 TN; 252/188.3 R; 260/2.5 AN; 260/2.5 AC; 260/2.5 AZ; 260/75 NC; 260/75 NK; 260/75 NP; 260/75 NQ; 260/75 N; 260/860

[51] Int. Cl.² ................. C08G 18/34; C08G 18/42

[58] Field of Search ..... 260/75 NK, 47 CB, 75 TN, 260/75 NC, 75 NP, 75 NQ, 75 N, 860, 2.5 AN, 2.5 AC, 2.5 AZ; 252/188.3 R

[56] References Cited

UNITED STATES PATENTS

| | | | |
|---|---|---|---|
| 2,625,531 | 1/1953 | Seeger | 260/45.4 |
| 2,970,119 | 1/1961 | Caldwell | 260/2.5 |
| 3,079,350 | 2/1963 | Bernstein | 260/2.5 |
| 3,296,211 | 1/1967 | Winkler et al. | 260/75 |
| 3,450,673 | 6/1969 | McKillip | 260/75 |

*Primary Examiner*—Lester L. Lee
*Attorney, Agent, or Firm*—Denis A. Firth; John Kekich

[57] ABSTRACT

Poly(ester amides) are obtained by heating a hydroxyl-containing or hydroxyl-free polyester of malonic acid with an organic polyisocyanate in the presence of a basic catalyst. Crosslinking of the polyester takes place by reaction of the isocyanate with the active hydrogen of the $CH_2$ group of the malonate to give amide linkages, in addition to formation of urethane linkages in the case where the polyester contains free hydroxyl groups. The products range from elastomeric materials, where the isocyanate is in the form of an isocyanate-terminated prepolymer derived by reaction of an organic polyisocyanate with a polyol, to more rigid plastics where the isocyanate is a "simple" isocyanate, i.e. not in prepolymer form.

26 Claims, No Drawings

POLYESTER-AMIDES PREPARED FROM POLYMALONATES AND ISOCYANATES

BACKGROUND OF THE INVENTION

1. Field of the Invention

This invention relates to novel polymers containing recurring amide and ester groups and is more particularly concerned with polymers derived by reaction of organic polyisocyanates and polyesters containing active hydrogen atoms attached directly to carbon atoms.

2. Description of the Prior Art

A variety of polymers, derived from polyisocyanates by reaction with compounds containing active hydrogen in the form of hydroxyl, amino or carboxylic groups, are known in the art. However, there have been relatively few polymers described which are derived by reaction of organic polyisocyanates with compounds containing active hydrogen attached directly to carbon atoms. We have now found that polymers having highly useful properties can be obtained by reaction of organic polyisocyanates with certain polyesters derived from malonic acid. We have also found that, in certain instances, the polymers can be prepared in simple manner from a storage stable blend of components which imparts considerable versatility to the uses and means of fabrication of these polymers.

SUMMARY OF THE INVENTION

This invention comprises poly(ester amides) which are the product of reacting, in the presence of a basic catalyst, a. a polymalonate having the formula:

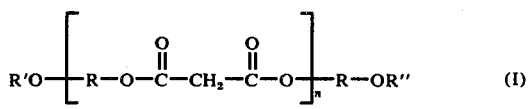

wherein $n$ is an integer from 1 to 20, R is the residue of a diol selected from the class consisting of alkanediols, cycloalkanediols, poly(alkylene glycols), di(hydroxyalkyl)ethers of dihydric phenols, and bis(hydroxyphenyl)alkanes, and R' and R'' are independently selected from the class consisting of hydrogen, hydrocarbylcarbamoyl, and the acyl radical of a hydrocarbon monocarboxylic acid; and b. an organic polyisocyanate.

The poly(ester-amides) of the invention are useful for a wide variety of purposes. The polymers derived from isocyanate-terminated prepolymers are elastomeric in nature and can be molded by conventional procedures into gaskets, seals, and the like, including all the many manifestations in which polyurethane and like related elastomers are currently fabricated. The polymers of the invention which are derived from organic polyisocyanates themselves (as opposed to isocyanate-terminated prepolymers) are generally more rigid and can be used for the fabrication of a wide variety of constructional elements as will be discussed more fully hereinafter.

The present invention also comprises a storage stable mixture of components, namely, a polymalonate as defined above and a polyisocyanate, which is capable of being cured, by application of heat and/or the addition of a catalyst, to yield a useful poly(ester-amide). As will be discussed hereinafter, this finding imparts great versatility to the manner of fabrication and the uses to which the polymers of the invention can be put.

The term "alkanediols" means an alkane from 2 to 8 carbon atoms, inclusive, which has two hydroxy groups attached to different carbon atoms in the chain thereof. Illustrative of alkanediols are ethylene glycol, 1,3-propanediol, 1,4-butanediol, 1,3-butanediol, 2,4-pentanediol, 3,4-hexanediol, 1,6-hexanediol, 1,7-heptanediol, 1,2-octanediol, 3,4-octanediol and the like.

The term "cycloalkanediols" means a cycloalkane having from 4 to 8 ring carbon atoms, inclusive, which has two hydroxy groups attached directly or indirectly to different carbon atoms in the ring. Illustrative of cycloalkanediols are 1,2-cyclobutanediol, 1,3-cyclopentanediol, 1,3-cyclohexanediol, 1,4-cyclohexanediol, 1,3-cycloheptanediol, 1,4-cycloheptanediol, 1,3-cyclooctanediol, 1,4-cyclohexanedimethanol, and the like.

The term "poly(alkylene glycol)" means a glycol of the formula

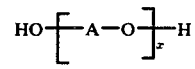

wherein A is alkylene from 1 to 6 carbon atoms and $x$ is an integer from 2 to 10. Illustrative of poly(alkylene glycols) are diethylene glycol, dipropylene glycol, dibutylene glycol, dihexylene glycol, tripropylene glycol, penta(ethylene glycol), hexa(propylene glycol), nona(ethylene glycol), deca(propylene glycol), and the like.

The term "di(hydroxyalkyl)ethers of dihydric phenols" means a compound of the formula

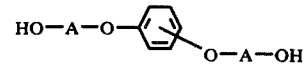

wherein A has the meaning above defined. Illustrative of such ethers are the di(2-hydroxyethyl) ethers, the di(2-hydroxypropyl) ethers, the di(4-hydroxybutyl) ethers, the di(3-hydrohexyl) ethers, and the di(2-hydroxypentyl) ethers of hydroquinone, resorcinol and catechol.

The term "bis(hydroxyphenyl)alkanes" means compounds of the formula

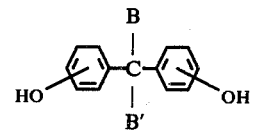

wherein B and B' are alkyl having from 1 to 6 carbon atoms, inclusive, i.e. methyl, ethyl, propyl, butyl, pentyl, hexyl, and isomeric forms thereof, and wherein B and B' taken together with the carbon atom to which they are attached form the residue of a cycloalkane as above defined and exemplified. Illustrative of bis(hydroxyphenyl)alkanes are Bisphenol-A[2,2-bis(4-hydroxyphenyl)propane], Bisphenol-B[2,2-bis(4-hydroxyphenyl)butane], 2,2-bis(4-hydroxyphenyl)hexane, 3,3-bis(4-hydroxyphenyl)octane, 1,1-bis(4-hydroxyphenyl)cyclohexane, and the like.

The term "hydrocarbylcarbamoyl" means a radical of the formula X—NH—CO— wherein X is hydrocarbyl from 1 to 12 carbon atoms. The latter term means the monovalent radical obtained by removing one hydrogen atom from the parent hydrocarbon having the stated carbon atom content. Illustrative of hydrocarbyl are alkyl such as methyl, ethyl, propyl, butyl, pentyl, hexyl, octyl, decyl, dodecyl and the like; alkenyl such as allyl, butenyl, hexenyl, octenyl, dodecenyl and the like; aralkyl such as benzyl, phenethyl, phenyl-propyl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like; and cycloalkenyl such as cyclopentenyl, cyclohexenyl, cycloheptenyl, cyclooctenyl, and the like.

The term "acyl radical of a hydrocarbon monocarboxylic acid" means a radical of the formula X—CO— wherein X is hydrocarbyl from 1 to 12 carbon atoms as defined above. Illustrative of acyl radicals of hydrocarbon monocarboxylic acids are acetyl, propionyl, butyryl, pentanoyl, hexanoyl, octanoyl, dodecanoyl, crotonoyl, benzoyl, totuoyl, naphthoyl, phenylbenzoyl, cyclohexanoyl, cyclooctanoyl, phenylacetic, cyclopentenoyl, cyclooctenoyl, and the like.

DETAILED DESCRIPTION OF THE INVENTION

The novel poly(ester-amides) of the invention are prepared by reacting the polymalonate of formula (I) and an organic polyisocyanate (II) in the presence of a basic catalyst. The reaction will proceed to some extent even at temperatures as low as 0° C depending upon the activity of the catalyst employed. However, in order to achieve useful rates of reaction it is generally necessary to employ elevated reaction temperatures. Advantageously the reaction temperature is within the range of about 50° C to about 200° C and preferably is within the range of about 100° to about 160° C.

The basic catalysts employed in the process of the invention are inclusive of tertiary amines such as trimethylamine, triethylamine, N-methyldiethylamine, N-methylpiperidine, N,N-dimethylaniline, N-methyl-N-propylaniline, N,N'-dimethylpiperazine, N-methylpyrrolidine, N-methylmorpholine, N-ethylmorpholine,N,N,N',N'-tetramethylbutanediamine, pyridine, quinoline, triethylenediamine, and the like; N,N-dimethylcyclohexylamine, N-methyl-N-ethylcyclohexylamine, N,N-dipropylcyclohexylamine, N,N-dimethylbenzylamine, N,N-diethylbenzylamine; N,N',N''-trialkylaminoalkyl hexahydrotriazines such as N,N',-N''-tris(dimethylaminomethyl)hexahydrotriazine, N,N',N''-tris(dimethylaminopropyl)hexahydrotriazine, N,N',N''-tris(diethylaminoethyl)hexahydrotriazine, and the like; and mono-, di- and tri-(dialkylaminoalkyl)phenols such as 2-(dimethylaminomethyl)phenol, 2-(dimethylaminobutyl)phenol, 2,4-bis(-dimethylaminomethyl)phenol, 2,4-bis(dipropylaminoethyl)phenol, 2,4,6-tris(dimethylaminoethyl)phenol, 2,4,6-tris(dimethylaminobutyl)phenol, and the like.

In a particular embodiment of the invention, which will be discussed more fully hereinafter it has been found that compounds known as aminimides, which decompose to yield a tertiary amine and an isocyanate at temperatures within the range given above for the reaction between the polymalonate (I) and the polyisocyanate (II), can be employed as latent source of the tertiary amine catalysts for the preparation of the polymers of the invention. The aminimides have particular utility in this regard since it is possible to prepare blends of the polymalonate (I) and polyisocyanate (II) with a catalytic amount of aminimide which are storage stable over prolonged periods of time, but which, at any desired time, can be employed to prepare a polymer of the invention simply by heating to a temperature at which the aminimide will decompose to yield tertiary amine. Further, by employing a diaminimide, which yields a diisocyanate as well as a tertiary amine on heating, it is possible to have the aminimide serve not only as a latent source of tertiary amine catalyst, but as a source of part or the whole of the polyisocyanate component. The monoaminimides (III) and the diaminimides (IV) are characterized by the formulae:

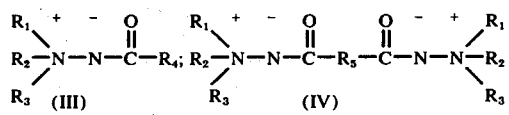

wherein $R_1$, $R_2$, $R_3$, and $R_4$ are monovalent hydrocarbyl preferably containing from 1 to 12 carbon atoms, as defined above, $R_1$ and $R_2$ taken together with the N atom to which they are attached can form a heterocyclic radical, and $R_5$ is a divalent hydrocarbyl group. Illustrative of heterocyclic radicals, formed by $R_1$ and $R_2$ taken together with the nitrogen to which they are attached, are pyrrolidinyl, pyrryl, pyrrolinyl, piperidinyl, and the like. The term "divalent hydrocarbyl" means the divalent radical obtained by removing two hydrogen atoms from different carbon atoms in a parent hydrocarbon having from 1 to 12 carbon atoms, inclusive. Illustrative of divalent hydrocarbyl are alkylene such as methylene, ethylene, propylene, butylene, hexylene, octylene, nonylene, decylene, dodecylene and isomeric forms thereof; cycloalkylene such as cyclopentylene, cyclohexylene, cycloheptylene, cyclooctylene and isomeric forms thereof, arylene such as phenylene, dimethylphenylene (tolylene), naphthylene, diphenylene and the like; aralkylene such as tolylene, i.e. 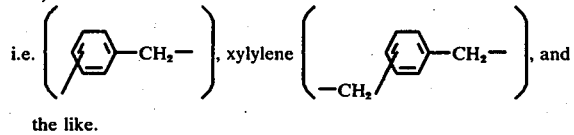

the like.

The aminimides (III) and (IV) are more fully described, together with methods for their preparation in U.S. Pat. Nos. 3,706,797; 3,706,800; 3,450,673 and 3,499,032. Illustrative of these compounds are trimethylamine caprylimide, trimethylamine methyl-myristimide, trimethylamine stearimide, trimethylamine β-cyclohexylaminopropionimide, triethylamine β-anilinopropionimide, trimethylamine α-methoxyacetimide, trimethylamine methacrylimide, trimethylamine benzimide, bis-trimethylamine malonimide, bis-trimethylamine adipimide, bis-tributylamine adipimide, bis-N-methylpyrrolidine adipimide, bis-N-methyl-2-methylpyrrolidine adipimide, bis-trimethylamine azelamide, bis-trimethylamine sebacimide, bis-trimethylamine terephthalimide, and the like.

The following equation illustrates the manner in which a typical aminimide breaks down on heating to yield an isocyanate and a tertiary amine:

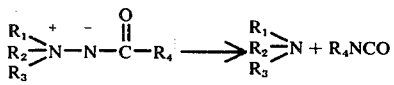

The tertiary amine, or "latent" tertiary amine, i.e. aminimide, is employed in catalytic amount in the reaction between the polymalonate (I) and the polyisocyanate (II). Advantageously the tertiary amine or aminimide is employed in amount of about 0.1 to about 5 percent by weight based on total reactants. Preferably, the tertiary amine or aminimide is employed in an amount within the range of 0.5 to 2 percent by weight based on total weight of reactants.

Advantageously the polymalonate (I) and the organic polyisocyanate (II) are employed in such proportions that there is at least one isocyanate group available for reaction with each hydroxyl group (if any) and one or more of the methylene ($-CH_2-$) groups in each molecule of the poly(malonate). By varying the proportion of reactants, as well as the nature of the reactants, it is possible to obtain polymers ranging from very lightly crosslinked elastomeric materials to highly crosslinked rigid plastics. Thus, where the polymalonate (I) contains free hydroxyl groups it is necessary to have sufficient polyisocyanate present to react with the free hydroxyl groups, i.e. there must be one isocyanato group present for each hydroxyl group. In addition to any isocyanato groups necessary to react with the hydroxyl groups if present, it is generally desirable to have the polyisocyanate present in such proportions that the ratio of isocyanate groups to methylene groups in the polymalonate is within the range of about 1:5 to about 2:1. However, proportions outside these ranges may be used without departing from the scope of the invention.

When the polymalonate (I) contains free hydroxyl groups, i.e. when one or both of the groups R' and R'' represent hydrogen, the initial reaction taking place between the polymalonate (I) and the polyisocyanate (II) will be that involving the hydroxyl groups and the isocyanato groups with the formation of urethane groups. Subsequently, reaction will occur between the active methylene group of the malonate (I) and the isocyanate with the formation of amide linkages. The following illustrates schematically the principal reaction involving the methylene groups which appears to take place.

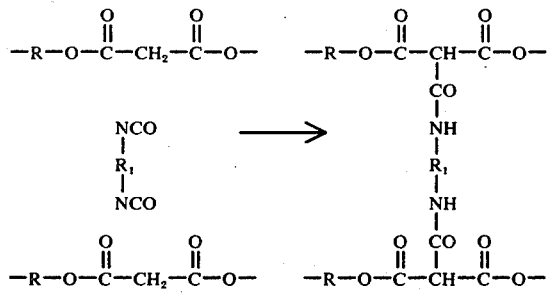

It is believed that the reaction shown above, in which R has the meaning hereinbefore defined and $R_1$ represents the residue of a typical diisocyanate, is the main reaction occuring. However, it is believed possible that other reactions can occur to a minor extent, e.g. further reaction of isocyanato groups with the NH groups of the amide or polymerization of the isocyanate to form isocyanurate moieties may occur.

It is to be understood that the above reaction schemes are given for purposes of explanation only and in no way are to be construed as defining the nature of the product obtained or otherwise limiting the scope of the present invention.

The properties of the polymers of the invention vary in accordance with the nature of the polymalonate (I) and/or the polyisocyanate (II) employed in their preparation as well as with the proportions in which the two reactants are employed. For example, the nature of the organic polyisocyanate (II) employed in preparing the polymers of the invention has a marked influence on properties. Any organic polyisocyanate commonly employed in the art of preparing polyurethanes can be employed in preparing novel polymers in accordance with the invention. Said organic polyisocyanates include 2,4-toluene diisocyanate, 2,6-toluene diisocyanate, 4,4-methylene bis(phenyl isocyanate), 2,4'-methylene bis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-$\beta,\beta'$-diisocyanate, tri(4-isocyanatophenyl)methane, and other di- and higher polyisocyanates such as those listed in the tables of Siefken, Annalen, 562, 122–135, 1949. Mixtures of two or more of the above isocyanates can be used, such as mixtures of the 2,4- and 2,6-isomers of toluene diisocyanate, mixtures of the 2,4'- and 4,4'-methylene bis(phenyl isocyanate) and the like.

In addition to the various isomers of methylene bis(phenyl isocyanate) and mixtures of these isomers, there can also be used modified forms of these isocyanates. For example, there can be used 4,4'-methylene bis(phenyl isocyanate) or an admixture thereof with a minor amount of the 2,4'-isomer, which has been treated to convert a minor proportion, generally less then 15 percent by weight of the starting material, to an artefact of the latter. For example, the polyisocyanate (II) can be methylene bis(phenyl isocyanate) which has been converted to a stable liquid form in accordance with the process of U.S. Pat. No. 3,384,653. Illustrative of another form of modified methylene bis(phenyl isocyanate) is the product obtained by treating 4,4'-methylene bis(phenyl isocyanate) or mixtures thereof with the 2,4'-isomer, with a minor proportion of a carbodiimide such as diphenyl carbodiimide in accordance with the process described in British Pat. No. 918,454.

In addition to the di- and higher polyisocyanates illustrated above, the organic polyisocyanates (II) employed in the preparation of the polymers of the invention include the isocyanate-terminated prepolymers obtained by reacting an excess of any of the polyisocyanates discussed above with a polyol. The polyols employed in making the isocyanate-terminated prepolymers can be any of those conventionally employed in the art for this purpose. Advantageously, said polyols have an hydroxy equivalent weight of about 30 to about 2,000 and a functionality from 2 to 4. Preferably, said polyols are diols, i.e. have a functionality of 2.

The polyols can be monomeric or polymeric and the latter can be polyesters or polyethers. Illustrative of the polyether polyols are polyoxyalkylene glycols such as polytetramethylene glycol, the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; polyether glycols prepared by reacting ethylene oxide, propylene oxide, or mixtures thereof with mono- and polynuclear dihydroxybenzene, e.g. catechol, resorcinol, hydroquinone, orcinol, 2,2-bis(p-hydroxyphenyl)propane, bis(p-hydroxyphenyl)methane and the like; and polyethers prepared by reacting ethylene oxide, propylene oxide, or mixtures thereof with aliphatic polyols such as glycerol, trimethylol-propane, 1,2,6-hexanetriol, and the like.

Illustrative of polyester polyols are those prepared by polymerizing ε-caprolactone using an initiator such as ethylene glycol, ethanolamine and the like, and those prepared by esterification of polycarboxylic acids such as phthalic, terephthallic, succinic, glutaric, adipic acids and the like with polyhydric alcohols such as ethylene glycol, butanediol, glycerol, trimethylolpropane, 1,2,6-hexanetriol and the like.

In preparing the isocyanate-terminated prepolymers the proportion of isocyanate groups to hydroxyl groups is advantageously within the range of about 1.5:1 to about 5:1 and preferably in the range of about 1.8:1 to 3:1. In accordance with procedures well recognized in the art the isocyanate-terminated prepolymers are readily prepared by bringing the isocyanate and polyol together, advantageously at elevated temperatures of the order of about 50° C or higher, and allowing the reaction to continue until free hydroxyl groups can no longer be detected in the mixture. Routine analytical techniques such as infrared spectroscopy can be used to determine this end point.

In a preferred embodiment of the invention the organic polyisocyanate (II) is an isocyanate-terminated prepolymer derived from (a) 4,4'-methylenebis(-phenylisocyanate), 2,4-toluene diisocyanate, 2,6-toluene diisocyanate or mixtures thereof, and (b) a polyether glycol having an hydroxyl equivalent weight from about 200 to about 2,000, using a ratio of isocyanate groups to hydroxyl groups in the range of about 1.8:1 to about 2.5:1.

In general the polymers of the invention which are prepared using the isocyanate-terminated prepolymers as the polyisocyanate (II) are elastomeric thermoplastic polymers which can be molded by any of the conventional techniques to form gaskets, seals, flexible couplings, ornamental objects and the myriad of articles which are currently fabricated from elastomeric materials. The polymers of the invention, particularly those which are prepared from polymalonates (I) having no free hydroxyl groups and which therefore have no urethane linkages in the resulting polymers show comparable elastomeric nature and strength properties to the commonly available polyurethanes.

In contrast, those polymers of the invention which are prepared using "simple" polyisocyanates rather than the isocyanate-terminated prepolymers discussed above, are generally rigid and possessed of good structural strength properties which permit their use in making reinforced rigid plastics, e.g. fiber glass reinforced rigid plastics, which can be employed for a wide variety of structural applications.

The polymers of the invention can also be prepared in cellular form (including microcellular embodiments of the elastomers, which embodiments find utility as shoe soles, shock absorbers and the like) by incorporating into the reaction mixture a blowing agent which generates gas at the reaction temperatures employed in preparing the polymers of the invention. Illustrative of such blowing agents are azodicarbonamide, azobisisobutyronitrile, dinitrosopentamethylenetetramine, and highly halogenated aliphatic hydrocarbons such as trichlorofluoromethane, dichloro difluoromethane, chloro trifluoromethane, and the like.

The polymalonates (I) which are employed in preparing the polymers of the invention are obtained by simple ester exchange reaction between a lower-alkyl ester, e.g. the diethyl ester of malonic acid, and the appropriate diol HO—R—OH where R has the significance defined above. The reaction is carried out by heating the mixture of ingredients at elevated temperature, for example, within the range of about 160° C to about 230° C and allowing the lower aliphatic alcohol which is eliminated in the reaction (e.g. ethanol in the case of the diethyl malonate starting material) to distill out of the reaction mixture. If desired, the ester exchange is promoted by the use of catalysts such as calcium acetate, antimony trioxide, p-toluenesulfonic acid and the like. The polymalonate (I) so obtained is hydroxy-terminated [i.e. $R' = R'' = H$ in the formula (I)]. The corresponding polymalonates in which $R'$ and $R''$ are hydrocarbamoyl or acyl can be obtained by reaction of the free hydroxy groups with the appropriate hydrocarbyl isocyanate or the appropriate hydrocarboncarboxylic acid halide or anhydride under conditions well-recognized in the art for such reactions.

The polymalonates of the formula (I) have molecular weights in the range of about 800 to about 5,000. A preferred group of polymalonates (I) are those in which R is the residue of an alkanediol and $R'$ and $R''$ are phenylcarbamoyl, and have a molecular weight in the range of about 1,000 to about 2,500.

In preparing the novel polymers of the invention the polymalonate (I) and the polyisocyanate (II) are brought together in the desired proportions, as discussed above, and are heated, in the presence of a basic catalyst, at a temperature of about 120° C to about 150° C. The heating is continued until the reaction product no longer contains any significant amount of free isocyanate — a condition which can be readily determined by routine analytical procedures such as infrared spectroscopic analysis. If desired, the properties of the polymers of the invention can be modified by incorporating into the reaction mixture other reactive hydrogen containing compounds, for example, polyols (including both polyester and polyether polyols), polyamines, alkanolamines, and the like, which are commonly employed in the polyurethane art. There can also be included in the reaction product various additives such as pigments, fire retardants, inert fillers, and the like.

In a particular embodiment of the invention, it has been found that a mixture of the polyisocyanate (II) and a polymalonate (I) which contains no free hydroxyl groups (i.e. $R'$ and $R''$ are both other than hydrogen) can be stored for prolonged periods without any significant reaction occurring. Accordingly it is possible to provide a so-called "one-pot" polymer, i.e. a mixture of the appropriate proportions of the polymalonate (I) and polyisocyanate (II) which can be stored for indefinite periods until required for use. When it is desired to make the finished polymer, it is merely necessary to add the appropriate amount of basic catalyst to the premix and to heat to a temperature in the above range.

In a preferred embodiment of the one-pot polymer, an aminimide of the formula (III) or (IV) is employed as catalyst and, using this type of catalyst, it is then possible to blend all the required reactants including catalyst and produce a storage stable composition which can, at any desired moment, be converted to polymer by heating to the appropriate temperature in the range set forth above. Such one-pot compositions are extremely useful as potting compositions, encapsulating compositions and the like. They are also useful in a wide variety of molding techniques since they can be charged to the appropriate mold and then converted to final polymer by heating in the mold. Thus the compositions are highly useful in the technique known as reaction injection molding in which the molding and polymer-forming reaction are carried out simultaneously. Other advantages of such one-pot, storage stable, compositions will be readily apparent to one skilled in the art.

It will also be apparent that the one-pot compositions in which the catalyst has to be added immediately prior to formation of the polymer, can also be employed in reaction injection molding and like techniques. It is merely necessary to choose a tertiary amine catalyst which has the requisite half life to permit molding to be carried out simultaneously with polymer formation.

Further, the polymers of the invention are thermoplastic and can be molded in any desired shape or form either during the actual heat curing step in the formation of the polymer as discussed above or in a subsequent step. Any of the equipment and processing conventionally employed in the molding or forming of thermoplastic materials can be applied to the polymers of the invention.

The following preparations and examples describe the manner and process of making and using the invention and set forth the best mode contemplated by the inventors of carrying out the invention but are not to be construed as limiting.

PREPARATION 1

A prepolymer (Prepolymer A) was prepared as follows:

To a batch of 300 g. (1.2 mole) of 4,4'-methylenebis(phenylisocyanate) at 70° C under nitrogen was added slowly, with stirring, 360 g. (ca 0.6 mole) of Carbowax 600 (polyethylene glycol, molecular weight circa 600: Union Carbide). When the addition was complete the mixture was maintained at 70° C with stirring for 2 hours. Infrared spectral analysis of an aliquot of the reaction mixture indicated the presence of free hydroxyl groups. Accordingly, the mixture was heated at 70° C for a further 1 hour at the end of which time the infrared spectrum of an aliquot showed no remaining hydroxyl groups. The product so obtained was cooled to room temperature under nitrogen. The resulting viscous isocyanate-terminated prepolymer (625.2 g.) was found to have an isocyanate equivalent of 575.

A second batch of prepolymer (Prepolymer B) was prepared using exactly the same procedure and same reactants as described above. There was obtained 636.7 g. of an isocyanate-terminated prepolymer having an isocyanate equivalent of 566.

PREPARATION 2

A prepolymer (Prepolymer C) was prepared using the procedure described in Preparation 1 but employing 518 g. (1 equiv.) of Carbowax 1000 (polyethylene glycol; molecular weight 1036: Union Carbide) and 250 g. (2 equivs.) of 4,4'-methylenebis(phenylisocyanate). The resulting isocyanate-terminated prepolymer had an isocyanate equivalent of 748.

PREPARATION 3

A poly(tetramethylene malonate) with terminal hydroxy groups (Polyester A) was prepared as follows:

A mixture of 300 g. (1.875 mole) of diethyl malonate, 400 g. (4.44 mole) of 1,4-butanediol, 0.15 g. of antimony trioxide and 0.35 g. of calcium acetate was heated under nitrogen with stirring at 160° C and the ethanol which was liberated was carried out of the reaction mixture and collected using a condenser. A total of 122.4 g. of ethanol was collected over a period of 24 hours. The resulting mixture was then distilled under reduced pressure (circa 9 mm. of mercury) at 180° C to remove excess butanediol. When no further distillate was collected, the temperature of the mixture was raised to 200° C at 5 – 6 mm. of mercury and maintained thereat for 3 hours. The temperature was raised to 210° C for 1 hour, then to 220° C for a second hour, and finally to 230° C for 2 hours. There was thus obtained 277.5 g. of a poly(tetramethylene malonate) having an hydroxyl equivalent weight of 540.5 corresponding to a molecular weight of 1081.

PREPARATION 4

A poly(tetramethylene malonate) with free hydroxyl groups (Polyester B) was prepared as follows:

A mixture of 4000 g. (44.44 mole) of 1,4-butanediol (previously dried over molecular sieves), 3000 g. (18.75 mole) of diethyl malonate, 3.5 g. of calcium acetate and 1.5 g. of antimony trioxide was heated with stirring at 160° C. The ethanol, which was eliminated in the reaction, distilled out of the reaction mixture and was condensed and collected. A total of 1600 ml. of ethanol was collected over a period of about 20 hours. When no further ethanol distilled, the mixture was heated to 180° C and the pressure in the reaction vessel was slowly reduced to 1 mm. of mercury over a period of 7.5 hrs. The resulting product was cooled to room temperature (circa 20° C) to obtain 5,275 g. of Polyester B having a hydroxyl equivalent weight of 795.

PREPARATION 5

A poly(tetramethylene malonate) with urethane capped terminal groups (Polyester C) was prepared as follows:

To 300 g. (0.189 equiv.) of the poly(tetramethylene malonate) (Polyester B) prepared as described in Preparation 4, was added, slowly with stirring, 58.3 g. (0.49 equiv.) of phenyl isocyanate. The resulting mixture was stirred for 10 minutes after admixture was complete and was then allowed to stand for 2 hours at circa 20° C. Finally the mixture was heated at 80° C for 15 hours in a vacuum oven at the end of which time the infrared spectrum of an aliquot showed no significant absorption bands corresponding to hydroxyl groups and isocyanate groups.

PREPARATION 6

A poly(tetramethylene malonate) with urethane capped terminal groups (Polyester D) was prepared as follows:

A total of 57.2 g. (0.48 mole) of phenyl isocyanate and twenty drops of stannous octoate solution (50% w/w in dioctyl phthalate) was added slowly with stirring to 120 g. (0.11 mole) of Polyester A (prepared as described in Preparation 3). The resulting mixture was agitated at room temperature (circa 20° C) of 30 minutes and then placed in a vacuum oven for 4 hours at room temperature followed by 6 hours at 100° C.

PREPARATION 7

Using the procedure described in Preparation 3, but replacing the 1,4-butanediol there used by an equivalent amount of ethylene glycol, 1,6-hexanediol, 1,4-octanediol, 1,4-cyclohexanediol, or the di(2-hydroxyethyl)ether of hydroquinone, there are obtained the corresponding poly(ethylene malonate), poly(hexamethylene malonate), poly(4-butyl-tetramethylene malonate), poly(1,4-cyclohexylene malonate) and poly(1,4-ethyleneoxyphenyl malonate), respectively.

PREPARATION 8

Using the procedure described in Preparation 1, a prepolymer (Prepolymer D) was prepared from 1283.5 g. (5.13 mole) of 4,4'-methylenebis(phenylisocyanate) and 1027 g. (2.54 mole) of Carbowax 400 (polyethylene glycol of average molecular weight 400: Union Carbide). There was obtained Prepolymer D having an isocyanate equivalent of 480.

PREPARATION 9

A urethane-terminated polyester (Polyester E) was prepared by mixing 250 g. (0.157 mole) of hydroxy-terminated Polyester B (Preparation 4), 39 g. (0.328 mole) of phenyl isocyanate and 20 drops of stannous octoate solution (50% w/w in dioctyl phthalate). The mixture was stirred by hand for 5 minutes and then allowed to stand for 30 minutes at room temperature. The product so obtained was heated at 85° C under reduced pressure for 5 hours at the end of which time infrared spectroscopic analysis showed no absorption bands characteristic of isocyanato and hydroxy groups.

PREPARATION 10

A mixture of 45 g. (0.03 mole) of polymalonate Polyester B (Preparation 4), 8 g. (0.078 mole) of acetic anhydride and 0.03 g. of p-toluene sulfonic acid was heated at 100° C for 10 hours with stirring. At the end of this heating period no absorption bands corresponding to free hydroxyl could be detected in the infrared spectrum of an aliquot. The resulting mixture was then heated under reduced pressure for 6 hours at 80° C to remove excess acetic anhydride and acetic acid. The residue was an acetate capped polymalonate corresponding to Polyester B.

EXAMPLE 1

A mixture of 38.2 g. (0.0332 mole) of Prepolymer A (Preparation 1), 18.1 g. (0.0146 mole) of Polyester C (Preparation 5) and 0.8 g. of triethylamine was vigorously agitated and then degassed under reduced pressure for 15 minutes. The resulting mixture was poured into a mold (4½ × 5½ × ⅛ inches) which had been preheated to 145° C. The mold temperature was maintained at 145° ± 3° C while the pressure on the mold was slowly increased, over a period of 12 minutes, to a maximum of 20,000 psi. There was thus obtained a yellow, transparent sheet of elastomer which was found to have the following properties:

| Density | : | 1.24 | g./cc. |
|---|---|---|---|
| Shore A Hardness (ASTM D 2240–68) | : | 60 | |
| Tear Strength Die C (ASTM D 624–54) | : | 60 | pli |
| Tensile Strength (ASTM D 412–68) | : | 430 | psi |
| Modulus at: | | | |
| 50% Elongation | : | 70 | psi |
| 100% elongation | : | 120 | psi |
| 200% elongation | : | 230 | psi |
| (ASTM D 412–68) | | | |
| Elongation at break (ASTM D 412–68) | : | 255% | |

The infrared spectrum of the elastomer showed absorption at 5.95 – 6.05 μ indicating the presence of the amide linkage.

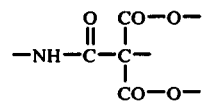

EXAMPLE 2

Using the procedure described in Example 1, but increasing the amount of Prepolymer A to 42 g. (0.0365 mole) and replacing Polyester C by 14 g. (0.0113 mole) of Polyester D (Preparation 6), there was obtained a clear yellow elastomer having the following properties:

| Density | : | 1.23 | g./cc. |
|---|---|---|---|
| Shore A Hardness | : | 63 | |
| Tear Strength Die C | : | 80 | pli |
| Tensile Strength | : | 1500 | psi |
| Modulus at : | | | |
| 50% elongation | : | 120 | psi |
| 100% elongation | : | 350 | psi |
| Elongation at break | : | 290% | |

EXAMPLE 3

Using the procedure described in Example 1, but increasing the amount of Prepolymer A to 42 g. (0.0365 mole) and replacing Polyester C by 14 g. (0.0127 mole) of hydroxy-terminated Polyester A, there was obtained a clear yellow elastomer having the following properties:

| Density | : | 1.24 | g./cc. |
|---|---|---|---|
| Shore A Hardness | : | 72 | |
| Tear Strength Die C | : | 95 | pli |
| Tensile Strength | : | 480 | psi |
| Modulus at: | | | |
| 50% elongation | : | 160 | psi |
| 100% elongation | : | 270 | psi |
| Elongation at break | : | 170% | |

| | | |
|---|---|---|
| Tensile Strength Modulus at: | : 280 | psi |
| 50% elongation | : 160 | psi |
| Elongation at break | : 75% | |

EXAMPLE 11

Using the procedure described in Example 1, but replacing the Prepolymer A by 41 g. (0.0455 mole) of Prepolymer D (Preparation 8) and replacing Polyester C by 16.5 g. (0.00949 mole) of the urethane-terminated Polyester E (Preparation 9), there was obtained a clear elastomer having the following properties:

| | | |
|---|---|---|
| Shore D Hardness | : 44 | |
| Tear Strength Die C | : 530 | pli |
| Tensile Strength Modulus at : | : 4280 | psi |
| 50% elongation | : 2200 | psi |
| 100% elongation | : 2750 | psi |
| Elongation at break | : 170% | |

EXAMPLE 12

Using the procedure described in Example 1, but replacing Polyester C by the equivalent amount of the poly(ethylene malonate), poly(hexamethylene malonate), poly(4-butyltetramethylene malonate), poly(1,4-cyclohexylene malonate) or poly(1,4-ethyleneoxyphenyl malonate) prepared as described in Preparation 7, there are obtained elastomers in accordance with the invention.

EXAMPLE 13

A mixture of 15.1 g. (0.01 mole) of polymalonate Polyester B (Preparation 4), 41.2 g. (0.041 mole) of Adiprene-L-100 (an isocyanate-terminated prepolymer of toluene diisocyanate and polytetramethylene glycol of molecular weight 2000: DuPont) and 0.8 g. of triethylamine was blended thoroughly and deaerated under vacuum at room temperature (circa 20° C). The resulting mixture was poured into a mold (4½ × 5½ × ⅛ inches) pre-heated to 140° C and was molded at a pressure of 20,000 lbs. for 15 minutes. The resulting sheet of light yellow elastomer was found to have the following properties:

| | | |
|---|---|---|
| Density | : 1.11 | g./cc. |
| Shore A Hardness | : 54 | |
| Tear Strength Die C | : 150 | pli |
| Tensile Strength Modulus at: | : 850 | psi |
| 50% elongation | : 180 | psi |
| 100% elongation | : 270 | psi |
| 200% elongation | : 390 | psi |
| Elongation at break | : 310% | |

EXAMPLE 14

To a solution of 0.5 g. of bis(N,N-dimethyl-2-hydroxypropylamine)adipimide (Aminimide 20603: Ashland Chemicals) in 13.5 g. (0.009 mole) of the acetate capped polymalonate prepared as described in Preparation 10, was added 40.5 g. (0.0368 mole) of Prepolymer A (prepared as described in Preparation 1) and the mixture was thoroughly blended and then deaerated under vacuum at room temperature. The resulting mixture was poured into a mold (4½ × 5½ × ⅛ inches) which had been preheated to 140° C and the molding pressure was gradually increased to a maximum of 20,000 lbs. over a period of 25 minutes. There was thus obtained a yellow elastomeric sheet.

We claim:

1. A poly(ester-amide) which is the product of reacting, in the presence of a basic catalyst, a. a polymalonate having the formula

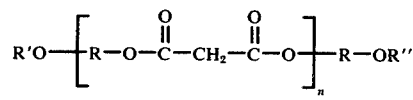

wherein $n$ is an integer from 1 to 20, R is the hydroxyl-free residue of a diol selected from the class consisting of alkanediols, cycloalkanediols, poly(alkylene glycols), di(hydroxyalkyl)ethers of dihydric phenols, and bis(hydroxyphenyl)alkanes, and R' and R'' are independently selected from the class consisting of hydrogen, hydrocarbylcarbamoyl, and the acyl radical of a hydrocarbon monocarboxylic acid; and b. an organic polyisocyanate in an amount such that there is at least one isocyanate group for each hydroxy group, if any, present in the polymalonate and there is also at least one isocyanate group for each molecule of polymalonate.

2. A polyester-amide according to claim 1 in which the polymalonate and polyisocyanate are reacted by heating at a temperature within the range of 50° C to 200° C.

3. A polyester-amide according to claim 1 wherein the polymalonate is a poly(tetramethylene malonate) having a molecular weight within the range of about 800 to about 5,000.

4. A polyester-amide according to claim 1 wherein the organic polyisocyanate is an isocyanate-terminated prepolymer of a polyol having an hydroxy equivalent weight in the range of about 30 to about 2,000 and a functionality of 2 to 4.

5. A polyester-amide according to claim 4 wherein the polyol employed in said prepolymer is a polyether glycol.

6. A polyester-amide according to claim 4 wherein the polyol employed in said prepolymer is a polyester diol.

7. A polyester-amide according to claim 1 wherein the basic catalyst is a tertiary amine.

8. A polyester-amide according to claim 7 wherein the basic catalyst is triethylamine.

9. A polyester-amide according to claim 1 wherein the catalyst is an aminimide of the formula

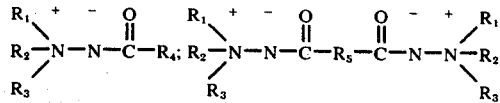

wherein $R_1$, $R_2$, $R_3$ and $R_4$ are monovalent hydrocarbyl from 1 to 12 carbon atoms, $R_1$ and $R_2$ taken together with the N atom to which they are attached additionally

EXAMPLE 4

Using the procedure described in Example 1, but replacing Prepolymer A by 44 g. (0.0396 mole) of Prepolymer B (Preparation 1) and replacing Polyester C by 14 g. (0.0104 mole) of Polyester D (Preparation 6), there was obtained a clear yellow elastomer having the following properties:

| | | |
|---|---|---|
| Density | : 1.25 | g./cc. |
| Shore A Hardness | : 70 | |
| Tear Strength Die C | : 75 | pli |
| Tensile Strength | : 2550 | psi |
| Modulus at : | | |
| 50% elongation | : 240 | psi |
| 100% elongation | : 640 | psi |
| 200% elongation | : 880 | psi |
| Elongation at break | : 320% | |

EXAMPLE 5

Using the procedure described in Example 1, but replacing the Prepolymer A by 41 g. (0.0368 mole) of Prepolymer B (Preparation 1) and replacing Polyester C by 10 g. (0.009 mole) of hydroxy-terminated Polyester A (Preparation 3), there was obtained a clear yellow elastomer having the following properties:

| | | |
|---|---|---|
| Density | : 1.24 | g./cc. |
| Shore A Hardness | : 74 | |
| Tear Strength Die C | : 85 | pli |
| Tensile Strength | : 1380 | psi |
| Modulus at : | | |
| 50% elongation | : 260 | psi |
| 100% elongation | : 490 | psi |
| 200% elongation | : 1280 | psi |
| Elongation at break | : 210% | |

EXAMPLE 6

Using the procedure described in Example 1, but replacng the Prepolymer A by 44.7 g. (0.0402 mole) of Prepolymer B (Preparation 1) and replacing Polyester C by 11.9 g. (0.0108 mole) of hydroxy-terminated Polyester B (Preparation 4), there was obtained a clear yellow elastomer having the following properties:

| | | |
|---|---|---|
| Density | : 1.24 | g./cc. |
| Shore A Hardness | : 71 | |
| Tensile Strength | : 1530 | psi |
| Modulus at: | | |
| 50% elongation | : 280 | psi |
| 100% elongation | : 540 | psi |
| 200% elongation | : 1400 | psi |
| Elongation at break | : 210% | |

EXAMPLE 7

Using the procedure described in Example 1, but replacing the Prepolymer A by 45 g. (0.0405 mole) of Prepolymer B (Preparation 1) and replacing Polyester C by 11.5 g. (0.0105 mole) of hydroxy-terminated Polyester B (Preparation 4), there was obtained a clear yellow elastomer.
The elastomer was heated, after demolding, at 145° C for 23 hours and was then found to have the following physical properties:

| | | |
|---|---|---|
| Density | : 1.24 | g./cc. |
| Shore A Hardness | : 61 | |
| Tensile Strength | : 950 | psi |
| Modulus at: | | |
| 50% elongation | : 120 | psi |
| 100% elongation | : 190 | psi |
| 200% elongation | : 310 | psi |
| Elongation at break | : 340% | |

EXAMPLE 8

Using the procedure described in Example 1, but replacing the Prepolymer A by 47 g. (0.0314 mole) of Prepolymer C (preparation 2: derived from 1000 M.W. polyol) and replacing Polyester C by 12 g. (0.0097 mole) of urethane-terminated Polyester D (Preparation 6), there was obtained a clear yellow elastomer, softer than that of the previous Examples. The properties of this elastomer were found to be as follows:

| | | |
|---|---|---|
| Density | : 1.24 | g./cc. |
| Shore A Hardness | : 46 | |
| Tear Strength Die C | : 40 | pli |
| Tensile Strength | : 150 | psi |
| Modulus at: | | |
| 50% elongation | : 30 | psi |
| 100% elongation | : 45 | psi |
| 200% elongation | : 70 | psi |
| Elongation at break | : 355% | |

EXAMPLE 9

Using the procedure described in Example 1, but replacing the Prepolymer A by 46.2 g. (0.0309 mole) of Prepolymer C (Preparation 2: derived from 1000 M.W. polyol) and replacing Polyester C by 8.45 g. (0.0682 mole) of urethane-terminated Polyester D (Preparation 6), there was obtained a clear yellow elastomer having higher hardness than that of Example 8 from which it differs only in the greater proportion of prepolymer employed. The properties of the elastomer were found to be as follows:

| | | |
|---|---|---|
| Density | : 1.21 | g./cc. |
| Shore A Hardness | : 52 | |
| Tear Strength Die C | : 60 | pli |
| Tensile Strength | : 350 | psi |
| Modulus at : | | |
| 50% elongation | : 70 | psi |
| 100% elongation | : 130 | psi |
| 200% elongation | : 230 | psi |
| Elongation at break | : 285% | |

EXAMPLE 10

Using the procedure described in Example 1, but replacing the Prepolymer A by 45 g. (0.0301 mole) of Prepolymer C (Preparation 2: derived from 1000 M.W. polyol) and replacing Polyester C by 11 g. (0.011 mole) of hydroxy-terminated Polyester A (Preparation 3), there was obtained a clear elastomer having the following properties:

| | | |
|---|---|---|
| Density | : 1.21 | g./cc. |
| Shore A Hardness | : 62 | |
| Tear Strength Die C | : 45 | pli | represent a heterocyclic radical, and $R_5$ is a divalent hydrocarbyl from 1 to 12 carbon atoms.

10. A polyester-amide according to claim 9 wherein the aminimide is bis(N,N-dimethyl-2-hydroxypropylamine)adipimide.

11. A poly(ester-amide) which is the product of reacting, in the presence of a basic catalyst,
   a. a polymalonate having the formula

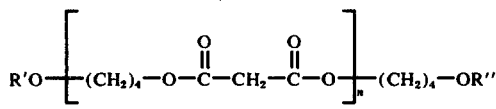

wherein R' and R" are independently selected from the class consisting of hydrogen and $C_6H_5NHCO$— and $n$ is an integer from 1 to 20; and
   b. an isocyanate-terminated prepolymer derived by reaction of 4,4'-methylene bis(phenyl isocyanate) with a polyol having a molecular weight from about 250 to about 4,500;
said polymalonate and said isocyanate-terminated prepolymer being employed in proportions such that, in addition to any isocyanate which is required to react with the hydroxyl groups, if any, present in said polymalonate, there is present excess isocyanate-terminated prepolymer in amount sufficient to provide a ratio of isocyanate groups to total methylene groups in the range of about 1:1 to 1:5.

12. A poly(ester-amide) according to claim 11 wherein R' and R" in said polymalonate are each hydrogen.

13. A poly(ester-amide) according to claim 11 wherein R' and R" in said polymalonate are each $C_6H_5NHCO$—.

14. A poly(ester-amide) according to claim 11 wherein R' and R" in said polymalonate are each acetyl.

15. A poly(ester-amide) according to claim 11 wherein the isocyanate-terminated prepolymer is one derived by reaction of an excess of an isocyanate selected from the class consisting of 4,4'-methylenebis(phenylisocyanate), 2,4-toluene diisocyanate, 2,6-toluene diisocyanate, and mixtures thereof, with a poly(alkylene glycol) having an hydroxyl equivalent weight in the range of about 200 to about 2,000.

16. A poly(ester-amide) according to claim 15 wherein the ratio of isocyanate groups to hydroxyl groups in the reaction of said diisocyanate and said glycol is in the range of about 1.8:1 to about 2.5:1.

17. A poly(ester-amide) according to claim 11 wherein the basic catalyst is a tertiary amine.

18. A poly(ester-amide) according to claim 17 wherein said tertiary amine is triethylamine.

19. A poly(ester-amide) according to claim 11 wherein the catalyst is an aminimide of the formula

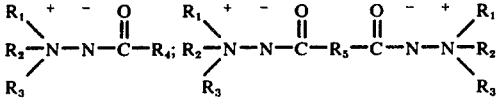

wherein $R_1$, $R_2$, $R_3$ and $R_4$ are monovalent hydrocarbyl from 1 to 12 carbon atoms, $R_1$ and $R_2$ taken together with the N atom to which they are attached additionally represent a heterocyclic radical, and $R_5$ is a divalent hydrocarbyl from 1 to 12 carbon atoms.

20. A poly(ester-amide) according to claim 19 wherein the aminimide is bis(N,N-dimethyl-2-hydroxypropylamine)adipimide.

21. A storage stable composition, adapted to form a poly(ester-amide) upon heating to a temperature in the range of 50° to 200° C in the presence of a basic catalyst, which composition comprises a mixture of
   a. a polymalonate having the formula

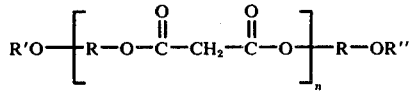

wherein $n$ is an integer from 1 to 20, R is the hydroxyl-free residue of a diol selected from the class consisting of alkanediols, cycloalkanediols, poly(alkylene glycols), di(hydroxyalkyl)ethers of dihydric phenols, and bis(hydroxyphenyl)alkanes, and R' and R" are independently selected from the class consisting of hydrocarbylcarbamoyl, and the acyl radical of a hydrocarbon monocarboxylic acid; and
   b. an organic polyisocyanate, the components (a) and (b) being employed in proportions such that there is at least one isocyanate group for each molecule of polymalonate.

22. A storage stable composition according to claim 21 wherein the organic polyisocyanate is an isocyanate-terminated prepolymer derived by reacting an excess of an isocyanate selected from the class consisting of 4,4'-methylenebis(phenylisocyanate), 2,4-toluene diisocyanate, 2,6-toluene diisocyanate, and mixtures thereof, with a polyether polyol having an hydroxyl equivalent weight in the range of about 200 to about 2,000.

23. A storage stable composition according to claim 21 wherein the polymalonate is one in which R represents the residue of 1,4-butanediol and R' and R" each represent $C_6H_5NHCO$—.

24. A storage stable composition according to claim 21 wherein the polymalonate is one in which R represents the residue of 1,4-butanediol and R' and R" each represent acetyl.

25. A storage stable composition according to claim 21 which also comprises a catalytic amount of an aminimide of the formula

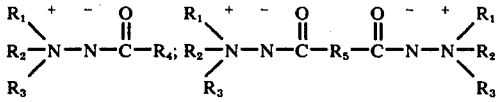

wherein $R_1$, $R_2$, $R_3$ and $R_4$ are monovalent hydrocarbyl from 1 to 12 carbon atoms, $R_1$ and $R_2$ taken together with the N atom to which they are attached additionally represent a heterocyclic radical, and $R_5$ is a divalent hydrocarbyl from 1 to 12 carbon atoms.

26. A storage stable composition according to claim 25 wherein the aminimide is bis(N,N-dimethyl-2-hydroxypropylamine)adipimide.

* * * * *